March 16, 1971     G. E. DAVIES ET AL     3,570,094
APPARATUS FOR MAKING A BALL JOINT ASSEMBLY
Original Filed Aug. 16, 1965     5 Sheets-Sheet 1
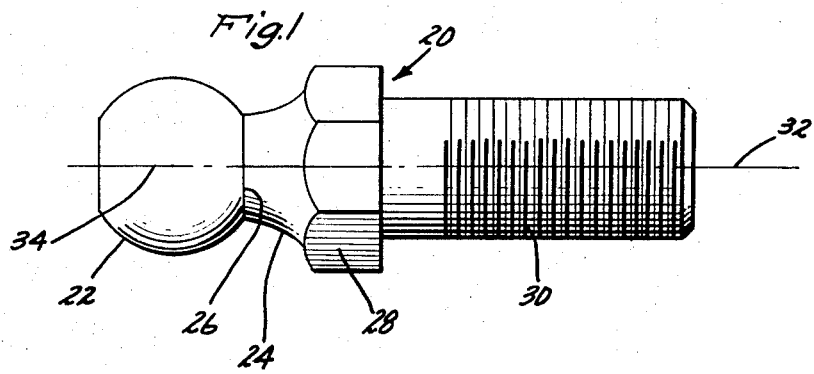
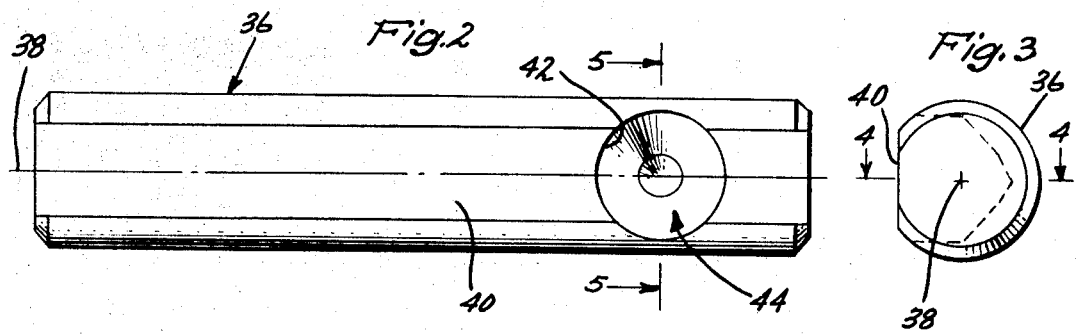
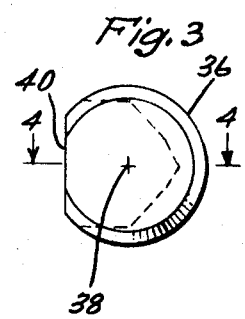
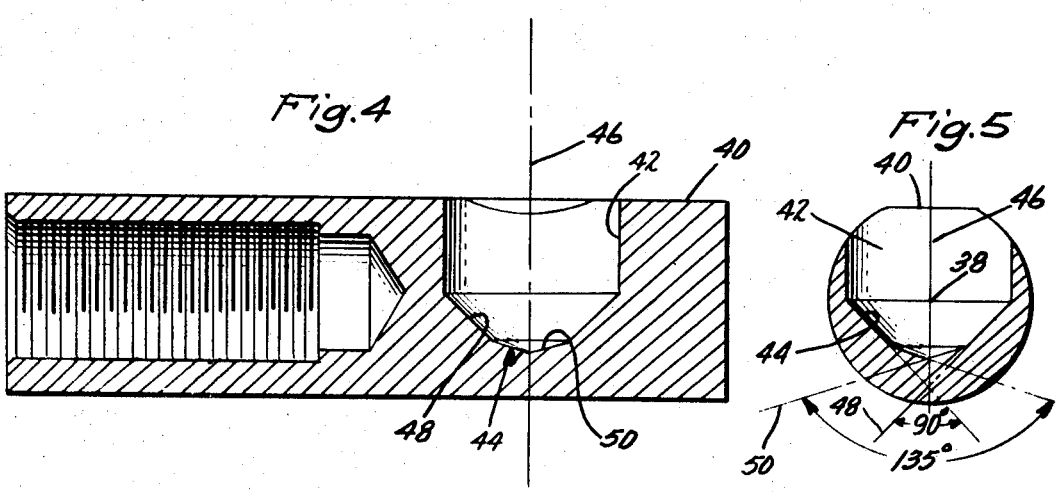
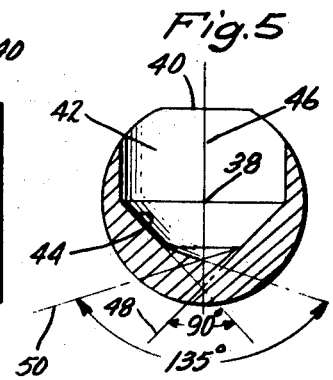
INVENTORS:
Gilbert E. Davies,
John M. Weston,
Gino L. Gasparini,
Hood, Gust, Irish & Lundy
Attorneys.

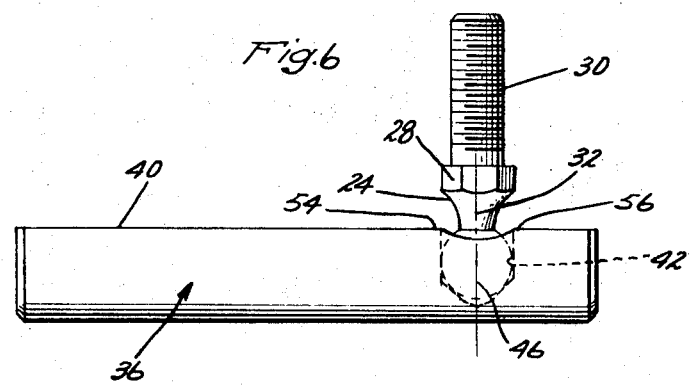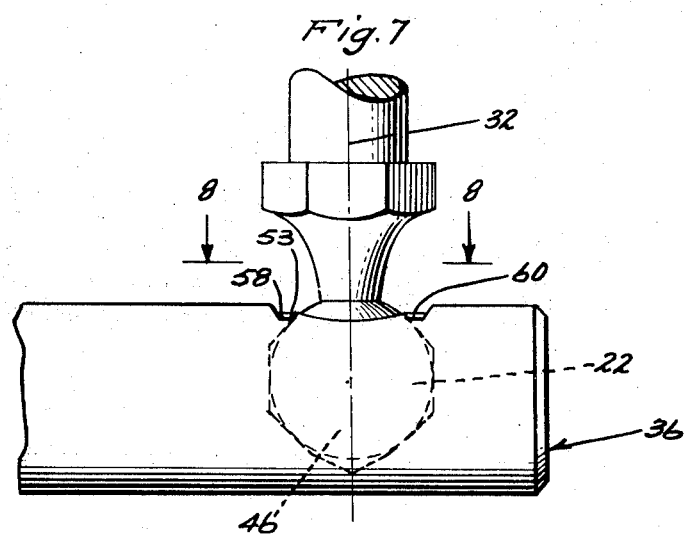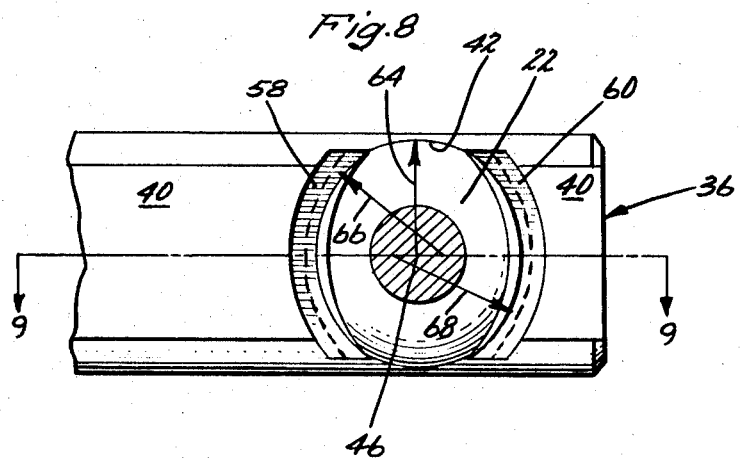

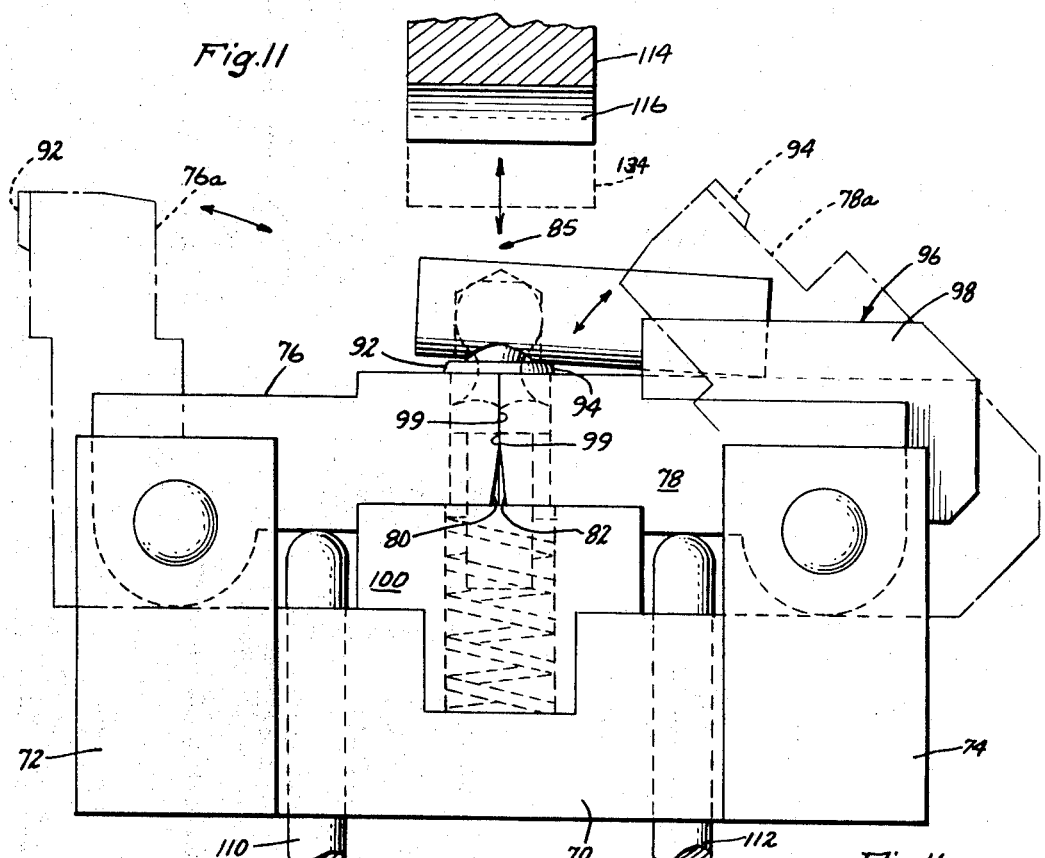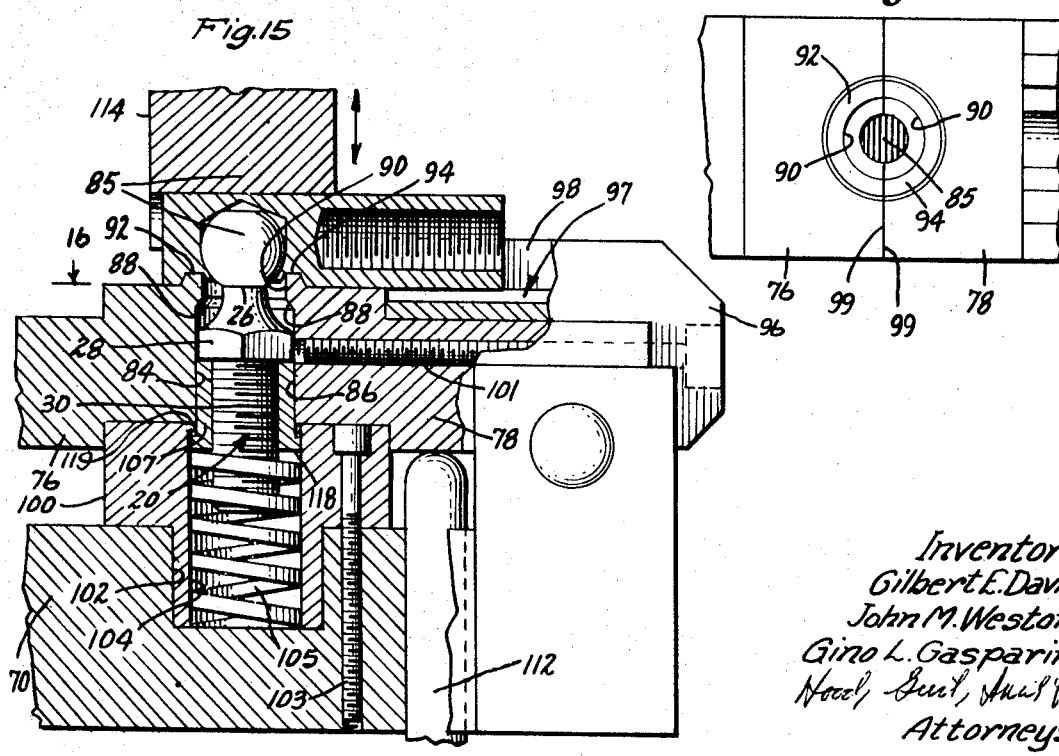

March 16, 1971 G. E. DAVIES ET AL 3,570,094
APPARATUS FOR MAKING A BALL JOINT ASSEMBLY
Original Filed Aug. 16, 1965 5 Sheets-Sheet 5
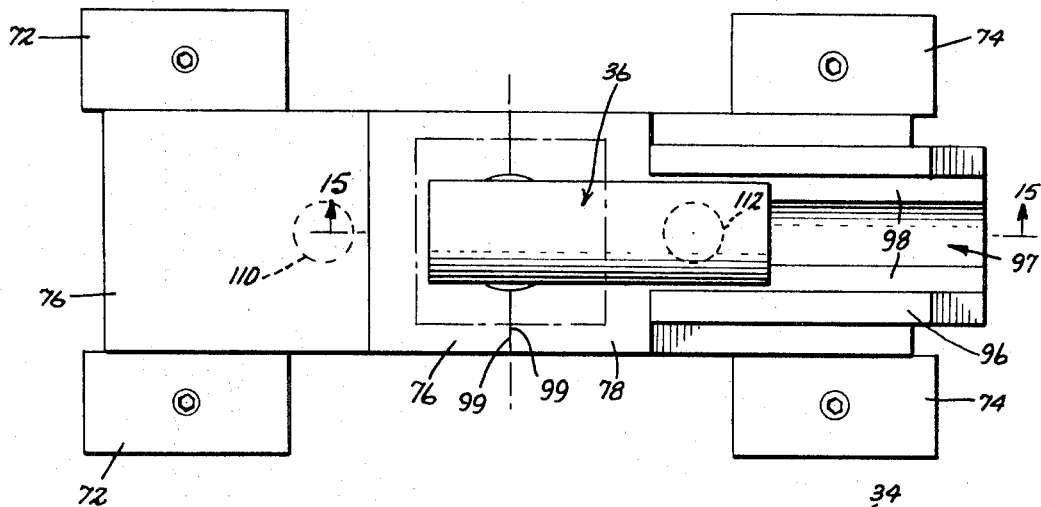
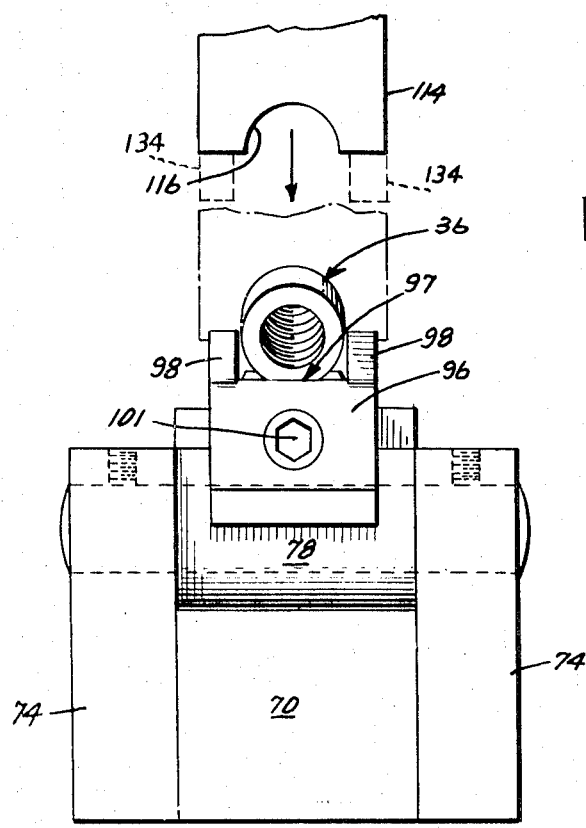
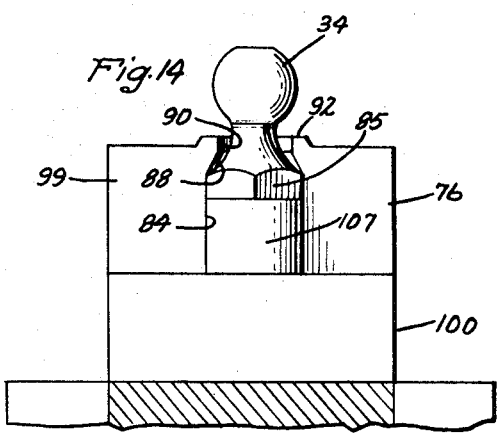
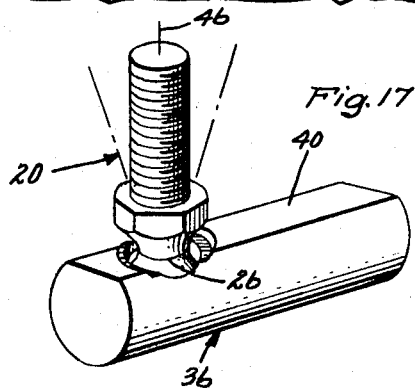
Inventors:
Gilbert E. Davies,
John M. Weston,
Gino L. Gasparini,
Attorneys.

United States Patent Office 3,570,094
Patented Mar. 16, 1971

3,570,094
APPARATUS FOR MAKING A BALL JOINT ASSEMBLY
Gilbert E. Davies, John M. Weston, and Gino L. Gasparini, Fort Wayne, Ind., assignors to Tuthill Pump Company
Original application Aug. 16, 1965, Ser. No. 479,860, now Patent No. 3,514,138, dated May 26, 1970. Divided and this application Aug. 18, 1969, Ser. No. 850,812
Int. Cl. B23p 19/00
U.S. Cl. 29—200
10 Claims

ABSTRACT OF THE DISCLOSURE

Apparatus for fabricating a ball joint assembly of the type including a metallic body having a flat surface with a socket extending inwardly from the flat surface and forming an opening therein, and a ball stud having an elongated shank with a ball on one end swivelly retained in the socket, the shank having a longitudinal axis coincident with a diameter of the ball. A base plate is provided having a backing member mounted thereon, the backing member having an outer surface and a cylindrical bore. A sleeve is telescopically received in the bore for receiving the other end of the shank with the one end and the ball spaced outwardly from the surface of the backing member. A compression spring in the bore bears against the sleeve and base plate. A pair of elongated punch members are provided having opposite ends, one end of each of the punch members being pivotally mounted on the base plate for swinging movement between adjacent positions in which the punch members extend in contiguous end-to-end relation, and spaced positions. The contiguous ends of the punch members have semi-cylindrical recesses therein which are juxtaposed and concentric about the longitudinal axis and which surround the one end of the shank. The punch members have outer sides with semi-circular punch edges projecting therefrom respectively contiguous to the recesses, the punch edges defining a circle concentric with the longitudinal axis and surrounding the portion of the ball adjacent the one end of the shank. The punch edges further define a plane normal to the longitudinal axis which is adapted to have the flat surface of the body positioned thereon with the ball received in the socket so that application of pressure to the body is a direction parallel with the longitudinal axis and toward the punch edges will cause the punch edges to indent portions of the flat surface of the body adjacent the socket opening inwardly toward the ball thereby to retain the ball in the socket.

BACKGROUND OF THE INVENTION

Field of the invention

The present invention relates to apparatus for making a ball joint assembly, and is a division of application Ser. No. 479,860 filed Aug. 16, 1965, now Pat. No. 3,514,-138, granted May 26, 1970.

DESCRIPTION OF THE PRIOR ART

In Davies Pat. No. 3,253,845 issued May 31, 1966, there is disclosed a ball joint assembly composed of two parts, namely, a body member containing a socket and a ball stud having a ball on one end thereof which is received for swiveling movement by the socket. The body member is primarily cylindrical and the socket is formed concentrically with the radius of the body. The ball is retained in the socket by staking opposite sides of the body adjacent to the socket for displacing metal inwardly around the ball. By reason of the geometries involved, and the particular construction, the angle of swiveling movement or tilt of the ball stud in the socket, the strength of the assembly, and the wear-life thereof are all determined.

SUMMARY OF THE INVENTION

The present invention provides apparatus for making a ball joint assembly which constitutes a decided improvement over the arrangements disclosed or claimed in the aforesaid Davies patent in the respects of improving wear-life, improving strength, reducing manufacturing costs, increasing the angle of swiveling movement of the ball stud, and the like.

In its broader aspects, the present invention provides apparatus for fabricating a ball joint assembly of the type including a metallic body having a flat surface thereon with a socket extending inwardly from the flat surface and forming an opening therein, the socket having an axis generally normal to the flat surface, and a ball stud having an elongated shank with a ball on one end thereon swivelly retained in the socket, the shank having a longitudinal axis coincident with a diameter of the ball. A support member is provided having means thereon for receiving and locating the other end of the shank with the one end thereof and the ball spaced from the member and means. A pair of punch members are provided mounted on the support member for relative movement between adjacent and spaced positions, the punch members respectively having surfaces which are facing in juxtaposed relation in the adjacent positions. The facing surfaces respectively have semi-cylindrical recesses formed therein which are juxtaposed and concentric about an axis coincident with the longitudinal axis and which surround the shank when the punch members are in their adjacent positions. The punch members respectively have outer sides with generally semi-circular punch edges projecting outwardly therefrom and respectively contiguous to the recesses, the punch edges generally defining a circle concentric with the longitudinal axis and generally surrounding the portion of the ball adjacent the one end of the shank when the punch members are in their adjacent positions. The punch edges further define a plane generally normal to the longitudinal axis when the punch members are in their adjacent positions and are adapted to have the flat surface of the body positioned thereon with the ball received in the socket and the horizontal axis generally coincident with the socket axis, so that application of pressure to the body in a direction generally parallel with the longitudinal axis and toward the punch edges will cause the punch edges to indent portions of the flat surface of the body adjacent the socket opening inwardly toward the ball thereby to retain the same in the socket.

An object of this invention is to provide apparatus for fabricating a ball joint assembly.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 1 is a side view of a typical ball stud of this invention;

FIG. 2 is a view of a body member having a socket drilled therein, this member representing one of the steps of the method in fabricating the ball joint assembly;

FIG. 3 is an end view of the body member of FIG. 2;

FIG. 4 is a longitudinal sectional view taken on section line 4—4 of FIG. 3;

FIG. 5 is a cross-sectional view taken substantially along the section line 5—5 of FIG. 2;

FIG. 6 is a side view showing another step in the method of fabricating the ball joint assembly of this invention;

FIG. 7 is a fragmentary side view of a finished ball joint assembly of this invention;

FIG. 8 is a fragmentary and sectioned view taken substantially along the section line 8—8 of FIG. 7;

FIG. 11 is a side view of an embodiment of the apparatus of this invention;

FIG. 12 is a top plan view of the arrangement of FIG. 11;

FIG. 13 is an end view thereof with a ball joint assembly in position thereon;

FIG. 14 is an end view of only a single die piece with a ball stud in position for receiving a socket member;

FIG. 15 is a fragmentary, longitudinal sectional view taken substantially along section line 15—15 of FIG. 12;

FIG. 16 is a fragmentary top plan view of the two die pieces with a ball stud mounted therebetween, the latter being sectioned through the neck thereof at right angles to the axis; and FIG. 17 is a perspective illustration of the finished ball and socket assembly.

DESCRIPTION OF THE PREFERRED EMBODIMENT

Figure 9:
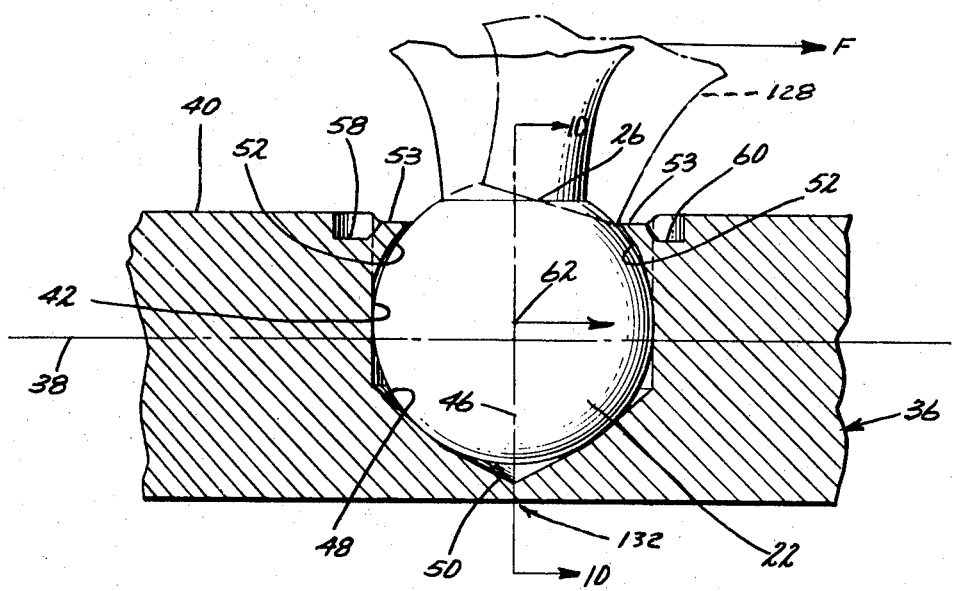
FIG. 9 is a longitudinal sectional view, also fragmentary, enlarged for clarity of illustration, of the ball joint arrangement of the preceding FIGS. 7 and 8.

Referring to FIG. 1, a ball stud, indicated generally by the reference numeral 20, is provided on one end thereof with a generally spherical ball 22, and a reduced diameter neck portion 24 having a circular neck line 26 which joins the ball 22. A nut portion 28 is joined to the neck portion 24, and a shank 30 extends axially from the neck and nut portions 24 and 28, respectively. The ball stud 20 is an integral construction preferably formed of steel with the ball 22 being hardened. The axis 32 of the shank 30 is coincident with an extension of a diameter 34 of the ball 22 as shown.

In FIG. 2 is illustrated the body member, indicated by the reference numeral 36, of the ball joint assembly, which is part cylindrical in shape and is formed of non-hardened metal, such as steel, brass, aluminum and the like. The material of this body member 20 is deliberately chosen to be softer than the hardened ball 22. The cylindrical part of this member 36 is coaxial about an axis 38 while the side 40 thereof is flat and parallel to the axis 38. In one embodiment of this invention, the width dimension of this flat side 40 is between that of a radius and a diameter of the cylindrical portion of the body member 36. As shown in FIG. 3, the flat side 40 appears to be a chord of a circle defined by the cross-section of the body 36.

In the right-hand end of the body 36 is a cavity or socket 42 of generally cylindrical shape but having a gradually tapered bottom 44 (see FIG. 5). The axis 46 of the cavity 42, in the preferred embodiment of this invention, is normal to the axis 38 of the body 36. The cavity 42 preferably is formed by a simple drilling operation, the point of the drill, which usually is tapered, forming the bottom 44.

As shown more clearly in FIGS. 4 and 5, the bottom portion 44 is formed in two tapered sections, one section indicated by the numeral 48 having a 90° taper (FIG. 5) and the tip section 50 having a 135° taper. Both of these tapered sections 48 and 50 are concentric with the cavity axis 46.

The diameter of the cavity 42 is made slightly larger than the width of the flat side 40 of the body 36 as shown more clearly in FIG. 2. Also, this diameter is made just slightly larger than the largest diameter of the ball 22. The cavity 42 is, therefore, of such size that the ball 22 may be received therein for pivotal movement without looseness.

Figure 10:
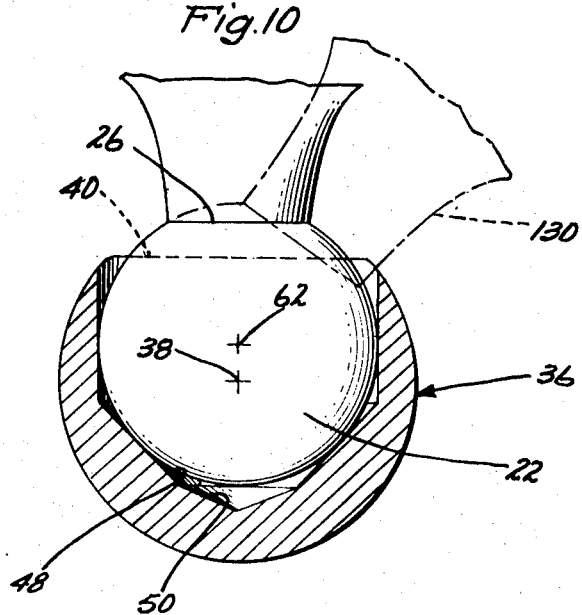
FIG. 10 is a partial cross-sectional view taken substantially along section line 10—10 of FIG. 9.

FIGS. 7, 8, 9 and 10 illustrate the ball 22 as being received by the body member 36, FIGS. 8 and 9 showing the cavity 42 deformed inwardly slightly to provide a part-spherical socket identified by the numeral 52 which substantially conforms to the shape of the upper portion of the ball 22. The method of deforming the cavity 42 so as to provide the contour just described will be explained more fully hereinafter. As shown in FIGS. 9 and 10, a slight clearance is provided between the wall of the socket 42, 52 and the ball 22 such that the latter may freely swivel therein.

The method of forming the part-spherical socket 52 will now be explained. In essence, metal is deformed from diametrically opposite portions of the body 36 adjacent to the cavity 42 so as to overlie portions of the upper surface of the ball 22 to prevent the latter from being withdrawn from the socket 52.

As shown in FIGS. 2, 3 and 6, the cavity axis 46 is not only perpendicular to the body axis 38 but also to the plane of the flat side 40. With the cavity 42 formed as shown in FIGS. 2, 3, 4 and 5, and the ball stud formed as already explained in connection with FIG. 1, the two parts are assembled as shown in FIG. 6. The ball 22 is inserted into the cavity 42 and the stud 20 is held in such position that the axis 32 thereof is coextensive with the cavity axis 46, such that the axis 32 is perpendicular to both the flat side 40 and the body axis 36.

With the body 36 and the ball stud 20 so held in position, diametrically opposite portions, indicated by the numerals 54 and 56, are coined so as to provide indentations 58 and 60, respectively. These indentations 58 and 60 are spaced apart in a direction axially of the body 36 such that the metal displaced by making the indentations 58 and 60 will be forced inwardly against the ball 22 as a backing thereby forming the part-spherical socket portions 53 (FIG. 9). Just enough coining force is used in making the arcuate indentations 58 and 60 that the ball 22 will not be frictionally bound in place and otherwise just the proper amount of clearance is provided for the ball 22 to swivel properly within the socket 42, 52.

As shown more clearly in FIG. 8, the arcuate extents of the two indentations 58 and 60 are longer than the width of the flat portion 40 so that the opposite end portions of the indentations enter into the rounded surface portions of body 36. Thus, it will appear that the indentations 58 and 60 are quite long in comparison to the width of the side 40 and thereby provide a substantial arcuate length of displaced material which forms the socket portion 52 and retains the ball 22 within the socket.

The coining operation, as previously explained, is performed on the flat side 40 at locations which are immediately adjacent to the perimeter of the socket 42 such that coining radially inwardly toward the axis 38 of the body will result in the metal being displaced radially inwardly against the ball 22 as a backing.

The ball and socket diameters as well as the dimensions of the body 36 are so selected that the center 62 of the ball 22 is positioned as closely as possible to the axis 38 when the ball 22 is seated onto the tapered bottom section 48 of the socket (FIGS. 4 and 5). FIGS. 9 and 10 illustrate this positioning in enlarged and exaggerated form to show the proximity of the ball center to the body axis. It may be stated at this point that by providing the flat side 40 on the body 36, the ball center 62 may be made to approach the body axis 38 more closely, for a given size of body 36, than any previous design has permitted. As will be explained later, this greatly increases the wear-life and tensile strength of the assembly, as well as tilt angle of the ball stud, all of these features being obtained in an arrangement which is no more expensive nor complicated than prior arrangements and, as a matter of fact, is less costly.

As shown in FIG. 8, the relationships between the radii and centers of curvature of the cavity 42 and the indentations 58 and 60 are indicated by the particular radii 64, 66 and 68. The two radii 66 and 68 indicate the curvatures of the midlines of the indentations 58 and 60 while the radius 64 indicates the curvature of the cavity 42. The centers of the two radii 66 and 68 are offset to opposite sides of the socket axis 46 in a direction axially of the body 36 as shown. While this geometric illustration indicates one design of this invention, it should be understood that this geometry may be varied slightly without departing from the spirit and scope of this invention. The variations will become apparent from the explanations that follow.

The coining operations described in the foregoing are preferably performed by the apparatus illustrated in FIGS. 11 through 16. This apparatus comprises a base plate 70 having a first pair of lugs 72 secured to and upstanding from the left-hand end of the plate 70 as shown, and a second pair 74 secured to and upstanding from the right-hand end thereof. Two elongated punch members 76 and 78 are hingedly secured to the lugs 72 and 74 as shown for swinging movement inwardly toward each other from the full-line positions of FIG. 11 to the open, dashed-line positions 76a and 78a as shown. In this closed position the punch members or blocks 76, 78 are substantially horizontal and in alignment with the ends thereof contiguous. The individual blocks 76 and 78 are substantially rectangular and preferably are made of steel. The facing ends thereof are inclined as indicated by the numerals 80 and 82 and in these ends are formed two semi-cylindrical recesses 84 and 86 which are coaxial about a common vertical axis 85 when the blocks are in the full-line position 76, 78. The upper portions of these recesses 84 and 86 are provided with inwardly angled shoulders 88 from which extend upwardly the smaller radiused portions 90 which are also coaxial about the axis 85.

Immediately above the curved portions 90 and constituting upward extensions thereof are punch edges 92 and 94 of semi-circular shape. These punch edges are concentric about the axis 85 and together form a substantially complete circle. The inner surfaces of these punch edges 92 and 94 are coextensive with the cylindrical portions 90. This is more clearly illustrated in FIG. 16 which shows the upper sides of the two members 76, 78 in the "down" or closed position (see FIGS. 11, 12 and 16).

Secured to the upper side of the punch member 78 is a matrix block 96 having an elongated nest 97 defined by two spaced parallel sides 98. The axis of this nest 97 extends parallel to the longitudinal axis of the base plate 70 and preferably is horizontal. A bolt 101 passing through both the block 96 and punch 78 secures the two together. Also, this axis lies in an upright plane, preferably, which includes the axis 85. The contiguous edges 99 of the punch blocks 76 and 78 when in the full line position of FIG. 11 extend parallel to this vertical plane.

A cylindrically shaped backing block 100 is snugly fitted into a socket 102 in the base plate 70 as shown, and is secured to the latter by means of a bolt 103. An upright cylindrical bore 104 in the block 100 is coaxial with respect to axis 85, and receives a helical compression spring 105. A centering sleeve 107 is telescopically fitted into the bore 104 and rests on top of the spring 105. The internal diameter of the sleeve 107 is selected to provide a sliding but close tolerance fit for receiving the shank 30. The semi-circular parts 84 and 86 are sized such as to fit intimately without binding the sleeve 107 and the nut portion 28 of the stud 20. The height of the block 100 is such that the punch members 76 and 78 are fully closed as shown and rest on the flat top of the block 100 as shown in FIG. 15.

As shown in FIGS. 11 through 16, all of the parts are so shaped and sized that the ball stud 20 of FIG. 1 may be inserted into the sleeve 107 with the nut portion 28 resting on top of the sleeve. The spring 105 and the sleeve 107, as well as the thicknesses of the punch members 76, 78 are so dimensioned that the stud 20 will assume the position shown in FIG. 15 with the coining edges 90 and 92 being slightly elevated above the stud neckline 26. Also, as is clearly shown in FIG. 15, the punch members 76, 78 solid rest on the backing block 100 which in turn also solidly rests on the base plate 70. The significance of this solid mounting will become apparent from the description that follows.

For swinging the punch blocks 76 and 78 upwardly about their axes, two plungers 110 and 112 which are reciprocally received by the base plate 70 are used, the upper ends of these plungers 110, 112 engaging the undersides of the respective blocks 76, 78 for elevating the latter.

Reference may be had to FIGS. 11, 12, 13 and 15 for explaining the operation of the apparatus which has just been described. Referring to FIG. 11, the punch members 76 and 78 are first swung to their open positions corresponding to the dashed line position 76a. The dashed line shape 78a for the punch block 78 is illustrative of a partially opened position. A ball stud 20 is inserted into the sleeve 107 (FIGS. 14 and 15) until the nut portion 28 rests on the top edge of the sleeve 107. The punch blocks 76 and 78 are swung to their downward or closed positions as shown in FIGS. 11, 12 and 15, the semi-circular recesses 84 and 86 now surrounding the sleeve 107. The ball 34 projects above the punch members 76, 78 to the position shown in FIG. 14.

A body member 36 is now mounted on the ball 34 by fitting the socket 42 thereover and resting the body 36 in the nest portion 97 between the two sides 98 as shown more clearly in FIGS. 12, 13 and 15. The relationship between the nest portion 97 and the ball 34 is such that the body member 36 will be substantially horizontally aligned with the flat surface 40 thereof resting on the punch edges 92 and 94.

A ram 114 having a suitable, semi-circular cavity 116 is next positioned immediately above the body member 36 in vertical alignment with the ball 34. The cavity 116 is also aligned with the cylindrical shape of the body member 36. So positioned, the ram 114 is brought downwardly against the upper side of the body 36 to force the punch edges 92 and 94 against the flat surface 40. The punch edges 92 and 94 are preferably coplanar and substantially horizontal such that as the ram 114 forces the body 36 downwardly, the side 40 will flatten against these punch edges 92 and 94. Thus, the punch edges 92 and 94 are instrumental in locating properly the body member 36 just prior to the coining operation.

At this point, it should be explained that the height of the spring 105 (FIG. 15) is such that the circumferential flange 118 on the bottom end of the sleeve 107 is normally engaged with the annular shoulder 119 on the backing block when the ram 114 is retracted and spaced vertically from the body 36. Further, the length of the sleeve 107 is such that the ball 22 will be spaced higher, with respect to the punch blocks 76 and 78, than shown in FIG. 15. Explained differently, the flat 40 of body 36, when the latter is fitted over the ball 22 (FIG. 15) will be spaced normally a short distance (0.010", e.g.) above the punch edges 92, 94 by reason of the ball 22 being held upwardly by sleeve 107 and spring 105. Thus, first engagement of ram 114 with body 36 will result in movement of body 36 into contact with punch edges 92, 94. Spring 105 will be correspondingly compressed and flange 118 will be slightly separated from annular shoulder 119. This spring compression results from the stud 20 being moved downwardly against the sleeve 107 by the body 36. This action is important, because the ram force can never bottom against reaction from the stud 20 but only against the body 36 engaging the solid backing of the punch edges 92, 94.

After the initial engagement of the ram 114 with the body 36, further downward movement of the ram 114 will result in moving the punch blocks 76 and 78 downwardly until they flatten against the backing block 100. As just stated, this results in depressing the stud 20 and compressing to a certain extent the spring 105, because the sleeve 107 is forced downwardly by the nut portion 28 of the ball stud and this sleeve 107 is in engagement with the upper end of the spring 105.

Further downward movement of the ram 114 causes the punch edges 92 and 94 to produce the indentations 58 and 60 (FIGS. 7, 8 and 9) previously described. These punch edges 92 and 94 produce the indentations 58 and 60 and coin the body metal upwardly against the ball 22 as a backing thereby completing the formation of the socket.

The ram 114 is retracted upwardly and the sleeve 107 is moved upwardly under the force of the spring 105. If the punch edges 92 and 94 should be stuck into the indentations formed into the body 36, the spring 105 breaks them apart. A slight clearance is provided between the flange 118 on the sleeve 107 and the shoulder 119 on the block 100 so that slight relative movement may be imparted to the body 36 with respect to the punch blocks 76 and 78.

Complete separation of the ram 114 from the body 36 permits the upward swinging of both punch blocks 76 and 78 and the removal of the assembled ball stud and body member from the sleeve 107.

In order to perform another operation, the procedure explained hereinabove is merely repeated.

With all the parts properly dimensioned as previously explained, the neck line 26, which is circular, defines a plane which is parallel and contiguous to but slightly above the flat side 40 when the stud axis is positioned coincident with the cavity axis 46. This being true, the ball stud may be swiveled in the socket 42, 52 to the dashed line positions 128 in FIG. 9 and 130 in FIG. 10, the flat surface 40 permitting this relatively large tilting angle. Thus, with the ball center 62 being positioned immediately adjacent to the body axis 38, the flat side 40 in cooperation with the other structural features decribed in the foregoing permit maximum tilting angles of the stud for given dimensions thereof. Also, maximum strength is provided in the joint assembly by positioning the ball center 62 as closely as possible to the body axis 38, and this may be explained as follows.

If it is assumed that the ball stud is positioned with its axis coincident with the cavity axis 46, and a force "F" applied as shown in FIG. 9 to the ball stud, a moment arm equal to the separation between the ball center 62 and the body axis 38 cooperates with this force in attempting to bend the body 36 about a point indicated by the numeral 132. The shorter this moment arm, the smaller is the bending moment at the point 132. Tests have actually proven that this design with the flat side 40 which permits deeper penetration of the ball 22 into the body member reduces this bending moment to such an extent that the strength of the joint assembly is vastly increased. The required tilting angles of the ball stud are increased also such that the desired functional attributes of the ball and socket are retained while an increase in strength thereof is achieved, all without adding to the sizes of the parts and strengths of the material used.

Since the indentations 58 and 60 coined into the flat side 40 are quite long, relatively speaking the amount of metal which is coined inwardly against the ball 22 is correspondingly great. This adds to the strength of the assembly which resists withdrawal of the ball 22 from the socket as well as the wear-life of the socket inasmuch as there is more material in engagement with the ball which is available for wear.

It should be noted that the coining indentations 58 and 60 are formed on opposite sides of the cavity 42 spaced in the direction extending parallel to the body axis 38. Thus, the deformation of the socket metal is limited to the arcuate length of the indentations 58 and 60 transversely of the body 36. The opposite sides of the socket 42, 52 transversely of the body 36 are therefore not shaped or deformed by the coining operation, but instead retain original shapes as segments of a cylinder, the shape of this cylinder being that of the original cavity 42 as illustrated and described in connection with FIGS. 2 and 3.

In a typical design for a ball 22 of about .615 inch in diameter, the socket 42 is given a diameter of about .620 inch. In this instance the diameter of the body is .749 inch with the minimum thickness of the body being about .683 inch. In an operating embodiment of this invention, the cavity axis 46 is positioned about .562 inch from the right-hand end of the body 36 as viewed in FIG. 4. Referring again to the dimensions of the ball stud of FIG. 1, the neck 26 has a diameter of about .375 inch. The depth of the cylindrical portion of the socket 42 as shown in FIGS. 4 and 5 coincides with a plane passing through the body which includes the axis 38 and is parallel to the flat side 40.

Obviously, these dimensions may be varied to suit design requirements without departing from the spirit and scope of this invention. As will now be appreciated, the fabrication of the ball joint assembly of this invention is materially simplified, among the reasons for this being the fact that in using the apparatus of FIGS. 11 through 16, proper location of both the body and stud are automatic in the process of performing the coining operation. With respect to the ball joint assembly itself, it has greater strength for withstanding shear and bending forces than any prior design, this increased strength being achieved without reducing the swivel angle of the stud or the wear-life of the joint.

Preferably, the transverse dimension of the body 36 taken between the flat surface 40 and the diametrically opposite portion of the body 36 is made equal to a standard wrench size so that the body can be held against rotation while a member is threaded into the threaded bore of the body 36 as shown in FIG. 4.

In the event it is desired to perform the aforedescribed coining operation against a ball 34 which is not hardened or harder than body 36, the ram 114 may be modified by providing depending flanges 134 shown in dashed lines in FIGS. 11 and 13. These flanges 134 are spaced apart a distance sufficient to straddle body 36 and the punch edges 92, 94 and are long enough to engage and bottom on the punch blocks 76, 78 when the coning indentations 58 and 60 have formed to the proper, predetermined depth. Thus, the metal of body 36 may be formed around the ball 22 without indenting the latter. The purpose of the flanges 134 is to limit the depth of the coining operation so as to prevent deforming forces from being applied to ball 22.

While there have been described above the principles of this invention in connection with specific apparatus, it is to be clearly understood that this description is made only by way of example and not as a limitation to the scope of the invention.

What is claimed is:

1. Apparatus for fabricating a ball joint assembly of the type including a metallic body having a flat surface thereon with a socket extending inwardly from said flat surface thereby forming an opening therein, said socket having an axis generally normal to said flat surface, and a ball stud having an elongated shank with a ball on one end thereof swivelly retained in said socket, said shank having a longitudinal axis coincident with a diameter of said ball, said apparatus comprising: a support member having means thereon for receiving and locating the other end of said shank with said one end and said ball spaced from said member and means, a pair of punch members mounted on said support member for relative movement between adjacent and spaced positions, said punch members respectively having surfaces which are facing in juxtaposed relation in said adjacent positions, said facing surfaces respectively having generally semi-cylindrical recesses formed therein which are juxtaposed and concentric about an axis coincident with said longitudinal axis and which surround said one end of said shank when said punch members are in said adjacent positions, said punch members respectively having outer sides with generally semi-circular punch edges projecting outwardly therefrom and respectively contiguous to said recesses, said punch edges generally defining a circle concentric with said longitudinal axis and generally surrounding the portion of said ball adjacent said one end of said shank when said punch members are in said adjacent positions, said punch edges further defining a plane generally normal to said longitudinal axis when said punch members are in said adjacent positions and being adapted to have said flat surface of said body positioned thereon with said ball received in said socket and said longitudinal axis generally coincident with said socket axis, whereby application of force to said body in a direction generally parallel with said longitudinal axis and toward said punch edges will cause said punch edges to indent portions of said flat surface of said body adjacent said socket opening inwardly toward said ball thereby to retain the same in said socket.

2. The apparatus of claim 1 further comprising means for supporting said body in said position.

3. The apparatus of claim 1 further comprising means relatively movable with respect to said support member in a direction generally parallel with said longitudinal axis and operatively engageable with said body for applying pressure thereon toward said punch edges thereby to cause said punch edges to indent said portions of said flat surface of said body.

4. The apparatus of claim 3 wherein said pressure applying means comprises a ram movable toward said punch edges.

5. The apparatus of claim 4 further comprising means on said ram for limiting its movement toward said punch edges.

6. The apparatus of claim 1 wherein said punch members are elongated and have opposite ends, said punch members extending in contiguous end-to-end relation when in said adjacent position with the adjacent ends thereof being said facing surfaces.

7. The apparatus of claim 6 wherein said support member comprises a base plate, said receiving and locating means including a backing member mounted on said base plate and have an outer surface, and means mounted for movement in said backing member for supporting said other end of said shank with said longitudinal axis generally normal to said outer surface, said movement of said supporting means being generally parallel with said longitudinal axis, said punch members in said adjacent positions being generally parallel with and supported by said outer surface of said backing member.

8. The apparatus of claim 7 wherein said punch members have their other ends pivotally mounted on said base plate for swinging movement between said adjacent and spaced positions about parallel axes which are respectively spaced on opposite sides of said longitudinal axis and which lie in a plane normal to said longitudinal axis.

9. The apparatus of claim 8 wherein said backing member has a bore therethrough having an axis coincident with said longitudinal axis, said supporting means comprising a sleeve telescopically received in said bore and a compression spring in said bore bearing at one end against said sleeve and at the other end against said base plate, said sleeve receiving said other end of said shank.

10. The apparatus of claim 9 wherein one of said punch members includes means for supporting said body in said position, and further comprising a ram movable in a direction generally parallel with said longitudinal axis toward said punch edges and operatively engageable with said body for applying pressure thereon toward said punch members thereby to cause said punch edges to indent said flat surface of said body, said ram having means thereon engageable with said punch members for limiting the extent of movement of said ram toward said punch edges.

References Cited
UNITED STATES PATENTS

| | | | |
|---|---|---|---|
| 2,182,601 | 12/1939 | Venditty | 29—441X |
| 2,892,246 | 6/1959 | Mansfield | 29—441X |
| 3,253,330 | 5/1966 | Davies | 29—149.5X |

GRANVILLE Y. CUSTER, JR., Primary Examiner

UNITED STATES PATENT OFFICE
CERTIFICATE OF CORRECTION

Patent No. 3,570,094     Dated  March 16, 1971

Inventor(s) Gilbert E. Davies et al.

It is certified that error appears in the above-identified patent and that said Letters Patent are hereby corrected as shown below:

Column 6, line 6, "solid" should read -- solidly --.
Column 7, line 11, "upwardly" should read -- inwardly --.
Column 8, line 44, "coning" should read -- coining --.

Signed and sealed this 30th day of November 1971.

(SEAL)
Attest:

EDWARD M. FLETCHER, JR.            ROBERT GOTTSCHALK
Attesting Officer                  Acting Commissioner of Pat